(12) United States Patent
Sakaguchi et al.

(10) Patent No.: US 10,753,747 B2
(45) Date of Patent: Aug. 25, 2020

(54) WORK VEHICLE, DISPLAY METHOD FOR WORK VEHICLE, AND DISPLAY SYSTEM

(71) Applicant: Kubota Corporation, Osaka-shi (JP)

(72) Inventors: Kazuo Sakaguchi, Amagasaki (JP);
Izuru Shimamoto, Amagasaki (JP);
Kenji Tamatani, Amagasaki (JP);
Megumi Suzukawa, Amagasaki (JP);
Atsushi Shinkai, Sakai (JP)

(73) Assignee: KUBOTA CORPORATION,
Osaka-Shi (JP)

( * ) Notice: Subject to any disclaimer, the term of this patent is extended or adjusted under 35 U.S.C. 154(b) by 233 days.

(21) Appl. No.: 15/629,755

(22) Filed: Jun. 22, 2017

(65) Prior Publication Data
US 2018/0209793 A1 Jul. 26, 2018

(30) Foreign Application Priority Data

Jan. 20, 2017 (JP) ................................ 2017-008360

(51) Int. Cl.
*G01C 21/14* (2006.01)
*G01C 21/20* (2006.01)
(Continued)

(52) U.S. Cl.
CPC ............ *G01C 21/14* (2013.01); *A01B 69/008*
(2013.01); *B60W 30/10* (2013.01); *G01C 21/20* (2013.01);
(Continued)

(58) Field of Classification Search
CPC ...... G01C 21/14; G01C 21/20; A01B 69/008;
A01B 69/003; B60W 30/10; G05D 1/021;
(Continued)

(56) References Cited

U.S. PATENT DOCUMENTS 5,243,528 A * 9/1993 Lefebvre .............. G01C 21/367
340/990
7,143,363 B1 * 11/2006 Gaynor .................... B63J 99/00
715/771
(Continued)

FOREIGN PATENT DOCUMENTS

EP 3104244 12/2016
JP 9-178481 7/1997
(Continued)

OTHER PUBLICATIONS

Extended European Search Report for corresponding EP Application No. 17000969.0-1003, dated Jan. 23, 2018.
(Continued)

*Primary Examiner* — Marthe Y Marc-Coleman
(74) *Attorney, Agent, or Firm* — Mori & Ward, LLP

(57) ABSTRACT

A work vehicle includes a memory, a sensor, circuitry, and a display. The memory is to store a target travel route in a work field. The sensor is to detect an actual travel track of the work vehicle to find a traveled portion of the target travel route, along which the work vehicle has traveled. The circuitry is configured to calculate an index value indicating a degree of a deviation of the actual travel track from the target travel route. The display is to display the traveled portion such that a display pattern to display the traveled portion is changed according to the index value.

7 Claims, 12 Drawing Sheets

(51) Int. Cl.
*A01B 69/04* (2006.01)
*B60W 30/10* (2006.01)
*G09B 29/10* (2006.01)
*A01B 69/00* (2006.01)
*G05D 1/02* (2020.01)

(52) U.S. Cl.
CPC ......... *G09B 29/106* (2013.01); *A01B 69/003* (2013.01); *G05D 1/0212* (2013.01)

(58) Field of Classification Search
CPC ......... G05D 1/0212; G05D 2201/0201; G09B 29/106
USPC ........................................................ 701/300
See application file for complete search history.

(56) References Cited

U.S. PATENT DOCUMENTS

| | | | |
|---|---|---|---|
| 9,189,897 B1* | 11/2015 | Stenneth | B60W 40/06 |
| 2008/0269956 A1 | 10/2008 | Dix et al. | |
| 2009/0326763 A1* | 12/2009 | Rekow | A01B 69/006 |
| | | | 701/42 |
| 2013/0218373 A1* | 8/2013 | Hedrick | B60K 37/02 |
| | | | 701/14 |
| 2016/0026182 A1* | 1/2016 | Boroditsky | G08G 1/0145 |
| | | | 701/23 |
| 2017/0168501 A1 | 6/2017 | Ogura et al. | |

FOREIGN PATENT DOCUMENTS

| | | |
|---|---|---|
| JP | 9-294413 | 11/1997 |
| JP | 2016-21890 | 2/2016 |
| WO | WO 2015/119263 | 8/2015 |

OTHER PUBLICATIONS

Japanese Office Action for corresponding JP Application No. 2017-008360, dated Mar. 26, 2020 (w/ machine translation).

* cited by examiner

WORK VEHICLE, DISPLAY METHOD FOR WORK VEHICLE, AND DISPLAY SYSTEM

CROSS-REFERENCE TO RELATED APPLICATIONS

The present application claims priority under 35 U. S. C. § 119 to Japanese Patent Application No. 2017-008360, filed Jan. 20, 2017. The contents of this application are incorporated herein by reference in their entirety.

BACKGROUND OF THE INVENTION

Field of the Invention

The present invention relates to a work vehicle, a display method for a work vehicle, and a display system.

Discussion of the Background

As the foregoing work vehicle, a work vehicle described in Japanese Patent Application Laid-open No. 9-178481 is already known, for example. Japanese Patent Application Laid-open No. 9-178481 describes a configuration in which a shape of a work field and a travel route suitable for travel performed by manual driving within the work field are displayed on a display ("a display screen of a display device" in Japanese Patent Application Laid-open No. 9-178481).

SUMMARY OF THE INVENTION

According to one aspect of the present invention, a work vehicle includes a memory, a sensor, circuitry, and a display. The memory is to store a target travel route in a work field. The sensor is to detect an actual travel track of the work vehicle to find a traveled portion of the target travel route, along which the work vehicle has traveled. The circuitry is configured to calculate an index value indicating a degree of a deviation of the actual travel track from the target travel route. The display is to display the traveled portion such that a display pattern to display the traveled portion is changed according to the index value.

According to another aspect of the present invention, a display method for a work vehicle, includes detecting an actual travel track of the work vehicle to find a traveled portion of the target travel route, along which the work vehicle has traveled. An index value indicating a degree of a deviation of the actual travel track from a target travel route in a work field is calculated. The target travel route is stored in a memory. The traveled portion is displayed such that a display pattern to display the traveled portion is changed according to the index value.

According to further aspect of the present invention, a work vehicle includes storage means, sensing means, calculation means, and display means. The storage means are for storing a target travel route in a work field. The sensing means are for detecting an actual travel track of the work vehicle to find a traveled portion of the target travel route, along which the work vehicle has traveled. The calculation means are for calculating an index value indicating a degree of a deviation of the actual travel track from the target travel route. The display means are for displaying the traveled portion such that a display pattern to display the traveled portion is changed according to the index value.

According to further aspect of the present invention, a display system includes a memory, a sensor, circuitry, and a display. The memory is to store a target travel route of a work vehicle in a work field. The sensor is to detect an actual travel track of the work vehicle to find a traveled portion of the target travel route, along which the work vehicle has traveled. The circuitry is configured to calculate an index value indicating a degree of a deviation of the actual travel track from the target travel route. The display is to display the traveled portion such that a display pattern to display the traveled portion is changed according to the index value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
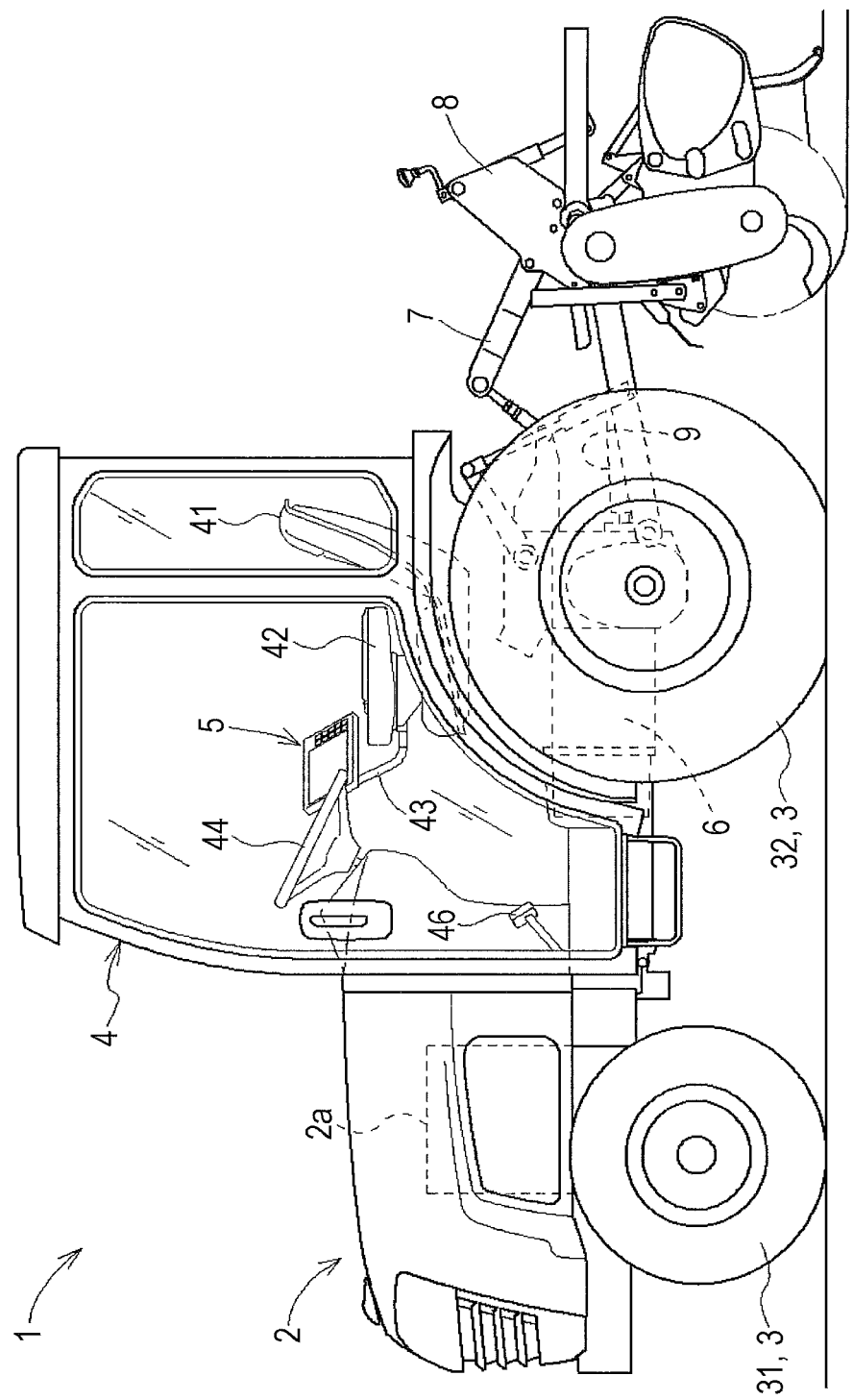
FIG. 1 is a left-side view of a tractor.

The embodiments will now be described with reference to the accompanying drawings, wherein like reference numerals designate corresponding or identical elements throughout the various drawings.

Embodiments of the present invention will be described with reference to the drawings. It is noted that unless specific statement is provided, a longitudinal direction in the following description will be referred to as follows. That is, a forward direction of travel of a machine body during work travel is "front", and a backward direction of travel of a machine body during work travel is "rear". Then, a direction corresponding to a right side with respect to a forward-facing orientation in a longitudinal direction is "right", and a direction corresponding to a left side is "left".

Also, in the description regarding FIGS. 3, 4, and 6 to 10, a rightward direction with respect to one who faces a paper sheet is "right, and a leftward direction with respect to one who faces a paper sheet is "left".

[Overall Configuration of Tractor]

FIG. 1 is a view showing a configuration of a tractor 1 which is one example of a work vehicle. The tractor 1 is configured so as to be capable of travelling and working by automatic driving.

As shown in FIG. 1, a prime mover part 2 is provided in a front portion of a machine body of the tractor 1. The prime mover part 2 includes an engine 2a. Also, the tractor 1 includes a wheel-type travel device 3. The travel device 3 includes a pair of right and left front wheels 31 and a pair of right and left rear wheels 32.

Motive power of the engine 2a is transmitted to the pair of right and left front wheels 31 and the pair of right and left rear wheels 32 via a main clutch (not shown) and a transmission 6. Then, the transmitted motive power drives the pair of right and left front wheels 31 and the pair of right and left rear wheels 32.

Figure 2:
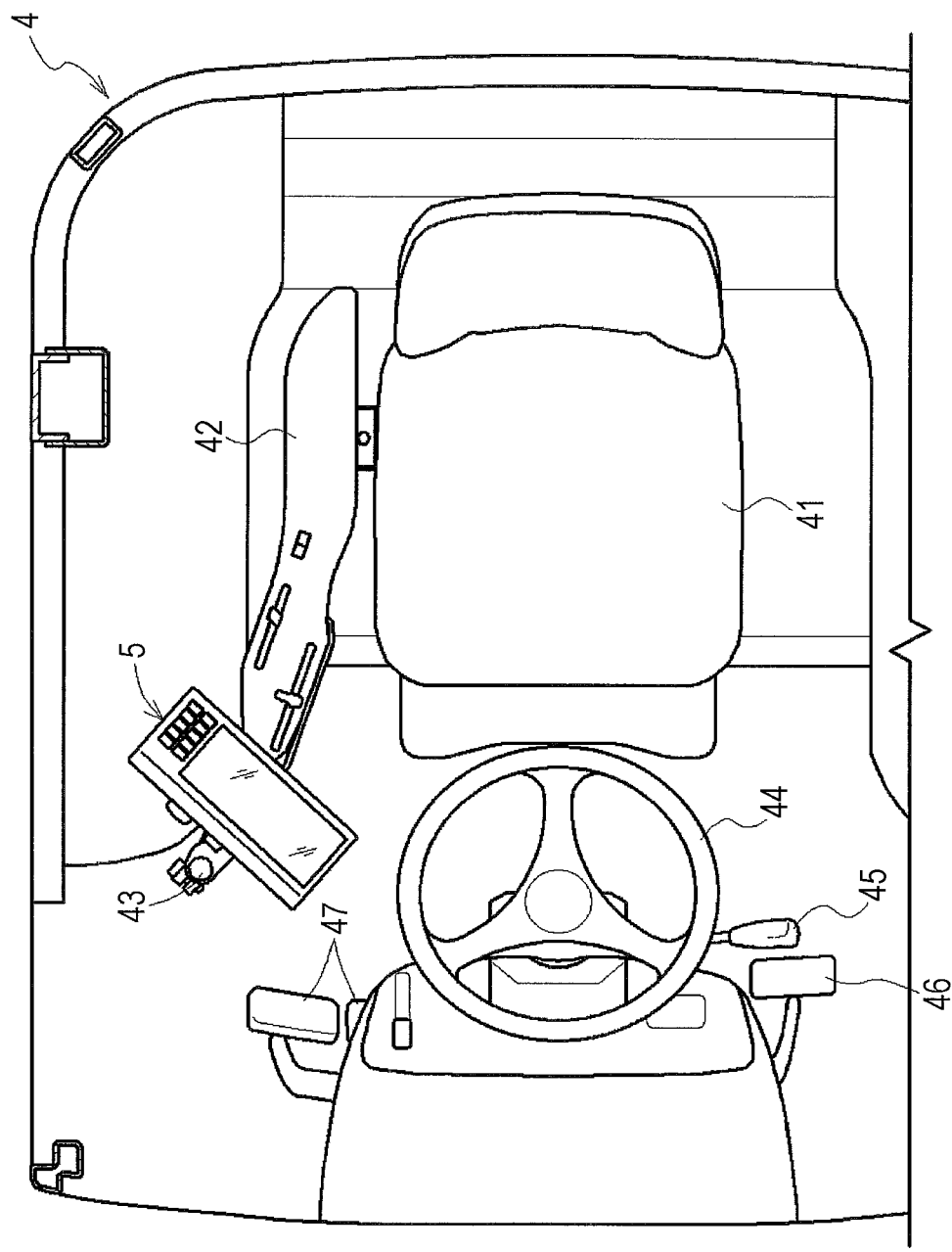
FIG. 2 is a plan view of a principal part when traversed, for showing a configuration of a cab part.

A cab part 4 is provided in the rear of the prime mover part 2. As shown in FIGS. 1 and 2, the cab part 4 includes a driver's seat 41, an arm rest 42, a supporting arm 43, a steering wheel 44, a shuttle lever 45, a clutch pedal 46, right and left brake pedals 47, and a terminal device 5. In the cab part 4, an operator can perform various driving operations manually.

As shown in FIGS. 1 and 2, the terminal device 5 is supported by the supporting arm 43. Also, an operator can perform a steering operation on the pair of right and left front wheels 31 by operating the steering wheel 44.

Also, an operator can switch the tractor 1 between forward movement and backward movement by operating the shuttle lever 45.

Also, an operator can perform an on/off operation of the main clutch by operating the clutch pedal 46.

Also, an operator can operate right and left side brakes by operating the right and left brake pedals 47.

As shown in FIG. 1, a cultivator 8 is attached to a rear portion of the tractor 1 via a lifting-up/down mechanism 7. Motive power of the engine 2a is transmitted to the cultivator 8 via a PTO shaft 9. Then, the transmitted motive power drives the cultivator 8.

The tractor 1 travels while driving the cultivator 8, so that work travel can be achieved.

Configuration of Terminal Device

Figure 3:
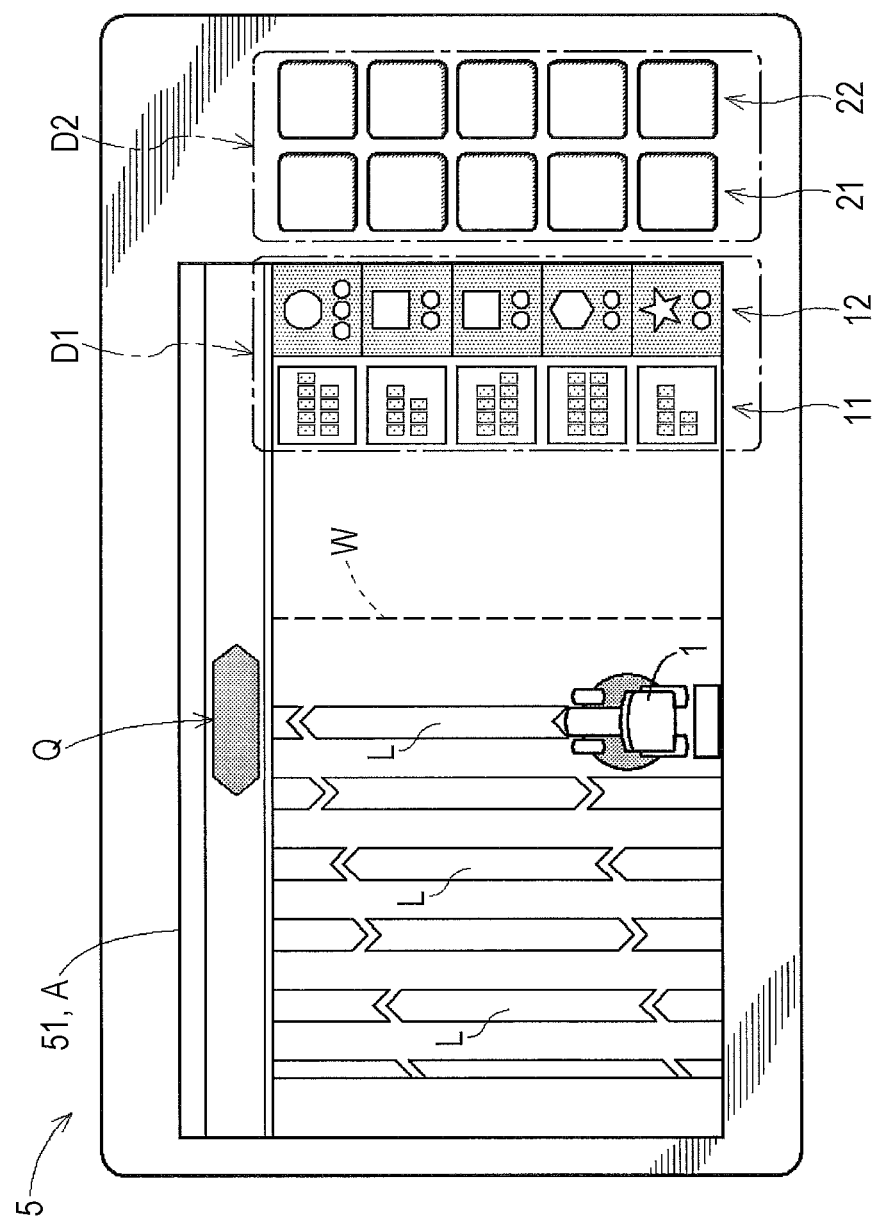
FIG. 3 is a view showing a configuration of a terminal device.
Figure 4:
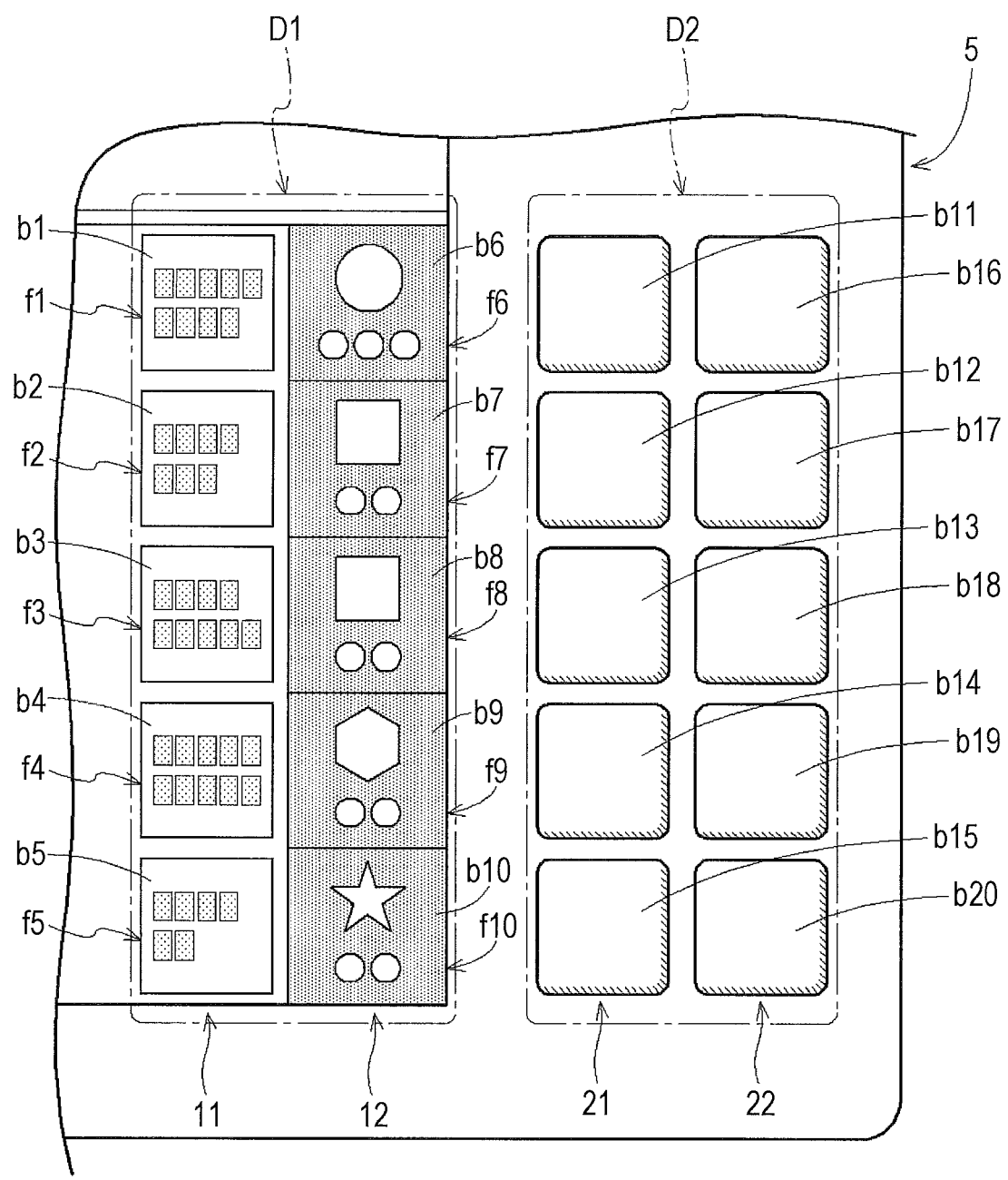
FIG. 4 is an enlarged view of a terminal device, for showing a configuration including a first touch button, a second touch button, a first physical button, and a second physical button.

FIGS. 3 and 4 are views showing the terminal device 5 during work travel which is performed by automatic driving. In this case, five first touch buttons 11 and five second touch buttons 12 each in vertical arrangement are displayed in a right end portion of a display 51 included in the terminal device 5. Different functions are assigned to the five first touch buttons 11 and the five second touch buttons 12, respectively.

Also, the display 51 is of a touch-panel type. An operator performs a touch operation on any one of the five first touch buttons 11 and the five second touch buttons 12, to thereby cause a function assigned to the one button being touched, to be fulfilled.

Also, work information which is information about work is displayed on the display 51. In an example shown in FIG. 3, as work information, a position of the tractor 1 in a work field W where work travel is performed, and a target travel route L in the work field W are displayed in a map form on the display 51.

As shown in FIGS. 3 and 4, the terminal device 5 includes five first physical buttons 21 and five second physical buttons 22 which are provided outside the display 51. The five first physical buttons 21 and the five second physical buttons 22 are provided each in vertical arrangement.

Different functions are assigned to the five first physical buttons 21 and the five second physical buttons 22, respectively. An operator presses any one of the five first physical buttons 21 and the five second physical buttons 22, to thereby cause a function assigned to the one button being pressed, to be fulfilled.

As shown in FIGS. 3 and 4, the five first touch buttons 11 include a first button b1, a second button b2, a third button b3, a fourth button b4, and a fifth button b5. Also, the five second touch buttons 12 include a sixth button b6, a seventh button b7, an eighth button b8, a ninth button b9, and a tenth button b10.

Also, as shown in FIGS. 3 and 4, the five first physical buttons 21 include an eleventh button b11, a twelfth button b12, a thirteenth button b13, a fourteenth button b14, and a fifteenth button b15. Also, the five second physical buttons 22 include a sixteenth button b16, a seventeenth button b17, an eighteenth button b18, a nineteenth button b19, and a twentieth button b20.

As shown in FIGS. 3 and 4, arrangement of the five first touch buttons 11 corresponds to arrangement of the five first physical buttons 21. Also, arrangement of the five second touch buttons 12 corresponds to arrangement of the five second physical buttons 22.

Also, as shown in FIGS. 3 and 4, the five second touch buttons 12 are displayed adjacently to the five first touch buttons 11. Further, the five second physical buttons 22 are provided adjacently to the five first physical buttons 21. Then, a touch-button display area D1 where the five first touch buttons 11 and the five second touch buttons 12 are displayed and a physical-button placement area D2 where the five first physical buttons 21 and the five second physical buttons 22 are placed, are adjacent to each other.

The same functions as assigned to the five first touch buttons 11 are assigned to the five first physical buttons 21. Also, the same functions as assigned to the five second touch buttons 12 are assigned to the five second physical buttons 22.

More specifically, the same function is assigned to the first button b and the eleventh button b11. Also, the same function is assigned to the second button b2 and the twelfth button b12. Then, similarly, the same functions are assigned to the third button b3 and the thirteenth button b13, the fourth button b4 and the fourteenth button b14, the fifth button b5 and the fifteenth button b15, the sixth button b6 and the sixteenth button b16, the seventh button b7 and the seventeenth button b17, the eighth button b8 and the eighteenth button b18, the ninth button b9 and the nineteenth button b19, and the tenth button b10 and the twentieth button b20, respectively.

That is, to each of the five first physical buttons 21, the same function of one out of the five first touch buttons 11, which positionally corresponds thereto, is assigned. Also, to each of the five second physical buttons 22, the same function of one out of the five second touch buttons 12, which positionally corresponds thereto, is assigned.

Also, as shown in FIGS. 3 and 4, the first to fifth buttons b1 to b5 include first to fifth function display parts f1 to f5, respectively. Also, the sixth to tenth buttons b6 to b10 include sixth to tenth function display parts f6 to f10, respectively.

The first to tenth function display parts f1 to f10 display functions assigned to the first to tenth buttons b1 to b10, respectively.

Also, as described above, functions of the first to tenth buttons b1 to b10 correspond to functions of the eleventh to twentieth buttons b11 to b20, respectively. This results in that the first to tenth function display parts f1 to f10 also display functions assigned to the eleventh to twentieth buttons b11 to b20, respectively.

Control Device

Figure 5:
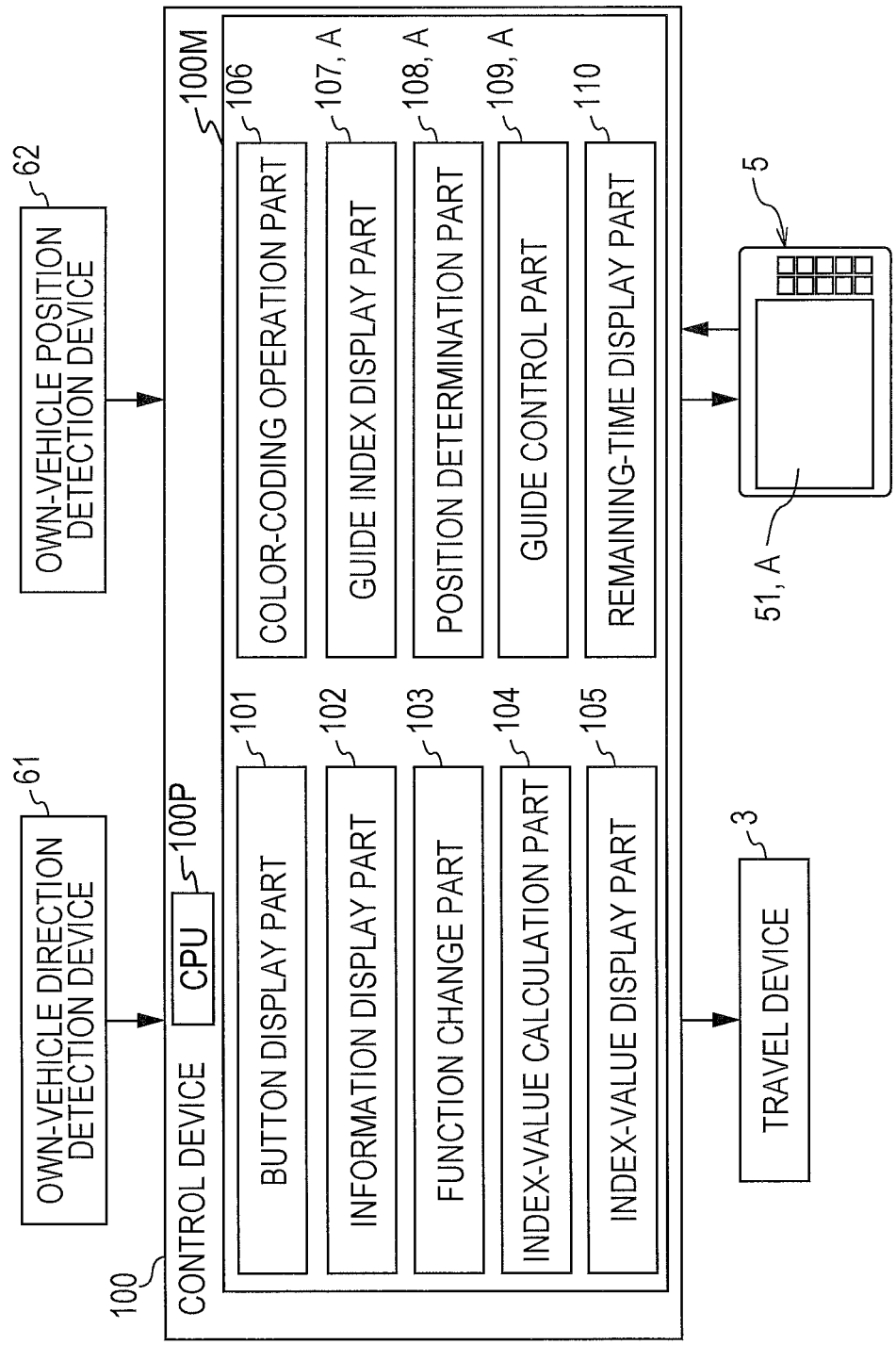
FIG. 5 is a block diagram showing a structure for control of a displaying operation of a display.

FIG. 5 shows an own-vehicle direction detection device 61 (a vehicle direction calculator 61, a sensor 61), an own-vehicle position detection device 62 (a vehicle position calculator 62, a sensor 62), and a control device 100. All of the own-vehicle direction detection device 61, the own-vehicle position detection device 62, and the control device 100 are included in the tractor 1.

The own-vehicle direction detection device 61 detects a direction in which an own vehicle travels. Also, the own-vehicle position detection device 62 detects a position of an own vehicle.

As shown in FIG. 5, the control device 100 receives various signals from the own-vehicle direction detection device 61, the own-vehicle position detection device 62, and the terminal device 5. Then, the control device 100 outputs a predetermined signal to the travel device 3 and the terminal device 5, based on the received various signals.

Also, as shown in FIG. 5, the control device 100 includes a button display part 101, an information display part 102, a function change part 103, an index-value calculation part 104 (which is equivalent to an "index-value calculation device" according to an embodiment of the present invention), an index-value display part 105 (which is equivalent to an "index-value display device" according to the embodiment of the present invention), a color-coding operation part 106 (which is equivalent to a "color-coding operation device" according to the embodiment of the present invention), a guide index display part 107, a position determination part 108, a guide control part 109, and a remaining-time display part 110 (which is equivalent to a "remaining-time display device" according to the embodiment of the present invention). In addition, the control device 100 includes a central processing unit (CPU) 100P (circuitry 100P) and a memory 100M. Programs of the button display part 101, the information display part 102, the function change part 103, the index-value calculation part 104, the index-value display part 105, the color-coding operation part 106, the guide index display part 107, the position determination part 108, the guide control part 109, and the remaining-time display part 110 are stored in the memory 100M and executed by the CPU 100P to perform functions of the button display part 101, the information display part 102, the function change part 103, the index-value calculation part 104, the index-value display part 105, the color-coding operation part 106, the guide index display part 107, the position determination part 108, the guide control part 109, and the remaining-time display part 110, respectively.

Also, as shown in FIGS. 3 and 5, the tractor 1 includes a travel control device A which controls travel of the tractor 1. The travel control device A includes the display 51, the guide index display part 107, the position determination part 108, and the guide control part 109.

The button display part 101 is configured to display the five first touch buttons 11 in vertical arrangement on the display 51. Also, the button display part 101 is configured to display the five second touch buttons 12 in vertical arrangement and on the right of the five first touch buttons 11 on the display 51.

The information display part 102 is configured to display work information on the display 51. For example, in FIG. 3, a position of the tractor 1 in the work field W where work travel is performed and the target travel route L in the work field W are displayed as work information on the display 51, by the information display part 102. The target travel route L is stored in the memory 100M.

Below, actions of respective parts of the control device 100 will be described, following a procedure of work travel of the tractor 1, which is performed by automatic driving.

Movement to Starting Position of Work Travel

First, referring to FIGS. 6 and 7, movement of the tractor 1 to a starting position S of work travel will be described.

In conducting work in the work field W using the tractor 1, an operator activates the terminal device 5, first. Then, the operator provides inputs for various settings using the terminal device 5. At that time, the operator provides inputs for settings of a lap width of cultivation, the number of revolutions of the engine 2a, and the like, for example.

Figure 6:
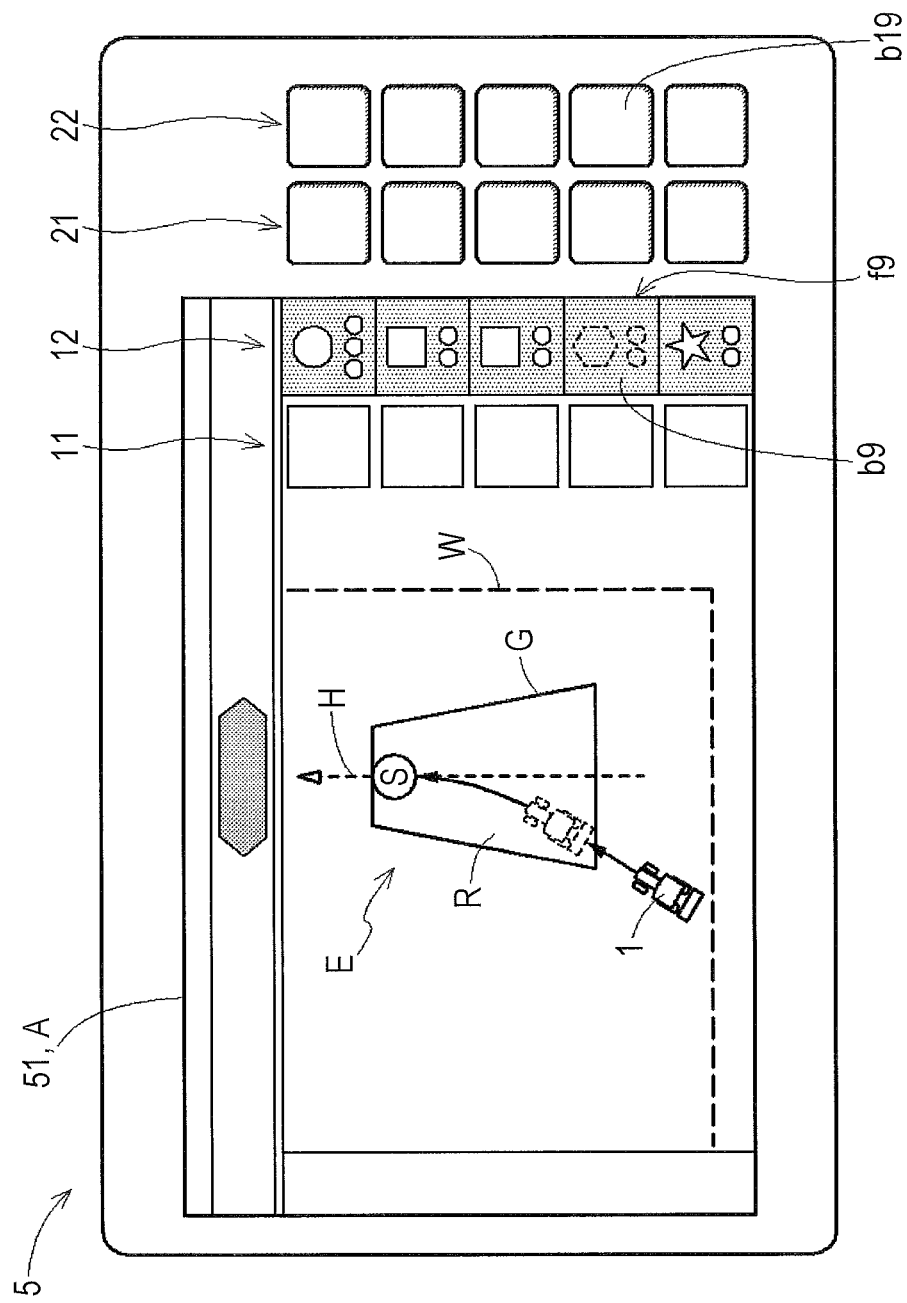
FIG. 6 is a view showing what is displayed on the display when movement to a starting position of work travel is made.

When inputting for various settings are completed, a current location of the tractor 1 and a guide index E are displayed on the display 51, as shown in FIG. 6. The guide index E is displayed on the display 51 by the guide index display part 107. Also, the guide index E corresponds to a guide start area R which is defined within the work field W.

The guide index E includes a figure G and a direction indication symbol H. The figure G represents a position and a shape of the guide start area R. Also, the direction indication symbol H represents a direction of travel of the tractor 1 at a starting time of work travel. A position of the direction indication symbol H displayed on the display 51 corresponds to a position of the guide start area R in the work field W.

As shown in FIG. 6, in the present embodiment, the guide start area R is in a trapezoidal shape. Accordingly, also the figure G displayed on the display 51 is in a trapezoidal shape. Also, in the present embodiment, the guide start area R has a shape which becomes narrower as it becomes closer to a front end in a direction of travel of the tractor 1 at a starting time of work travel.

The position determination part 108 shown in FIG. 5 is configured to determine whether or not the tractor 1 is placed within the guide start area R, based on a signal provided from the own-vehicle position detection device 62. Also, the guide control part 109 is configured to control the travel device 3 in such a manner that the tractor 1 travels to the starting position S of work travel when the position determination part 108 determines that the tractor 1 is placed within the guide start area R.

It is noted that, for determination of whether or not the tractor 1 is placed within the guide start area R, either whether a whole of the tractor 1 is placed within the guide start area R, or whether a part of the tractor 1 is placed within the guide start area R, may be determined.

Also, the guide index display part 107 shown in FIG. 5 can switch a display state of the guide index E between a first display state and a second display state. In a case where the position determination part 108 determines that the tractor 1 is not placed within the guide start area R, a display state of the guide index E becomes the first display state. On the other hand, in a case where the position determination part 108 determines that the tractor 1 is placed within the guide start area R, a display state of the guide index E becomes the second display state.

In the present embodiment, an inside of the figure G in the first display state is displayed in orange. Also, the inside of the figure G in the second display state is displayed in green. That is, a color of the guide index E in the first display state and a color of the guide index E in the second display state are different from each other.

As a result of this, an operator can grasp whether or not the tractor 1 is placed within the guide start area R.

In a case where the tractor 1 is placed in a position indicated by a solid line in FIG. 6, the position determination part 108 determines that the tractor 1 is not placed within the guide start area R. Accordingly, at that time, the guide control part 109 does not control the travel device 3. Also, at that time, the inside of the figure G is displayed in orange by the guide index display part 107.

Then, when an operator manually drives the tractor 1 and the tractor 1 reaches a position indicated by a broken line in FIG. 6, the position determination part 108 determines that the tractor 1 is placed within the guide start area R. As a result of this, the guide control part 109 starts controlling the travel device 3. Also, at that time, the guide index display part 107 changes a color of the inside of the figure G from orange to green.

It is noted that at that time, the tractor 1 may be configured to move to the position indicated by the broken line in FIG. 6 not manually, but by automatic driving.

Then, the guide control part 109 controls the travel device 3, so that the tractor 1 automatically travels from the position indicated by the broken line in FIG. 6 to the starting position S. As a result of this, movement of the tractor 1 to the starting position S is completed.

Figure 7:
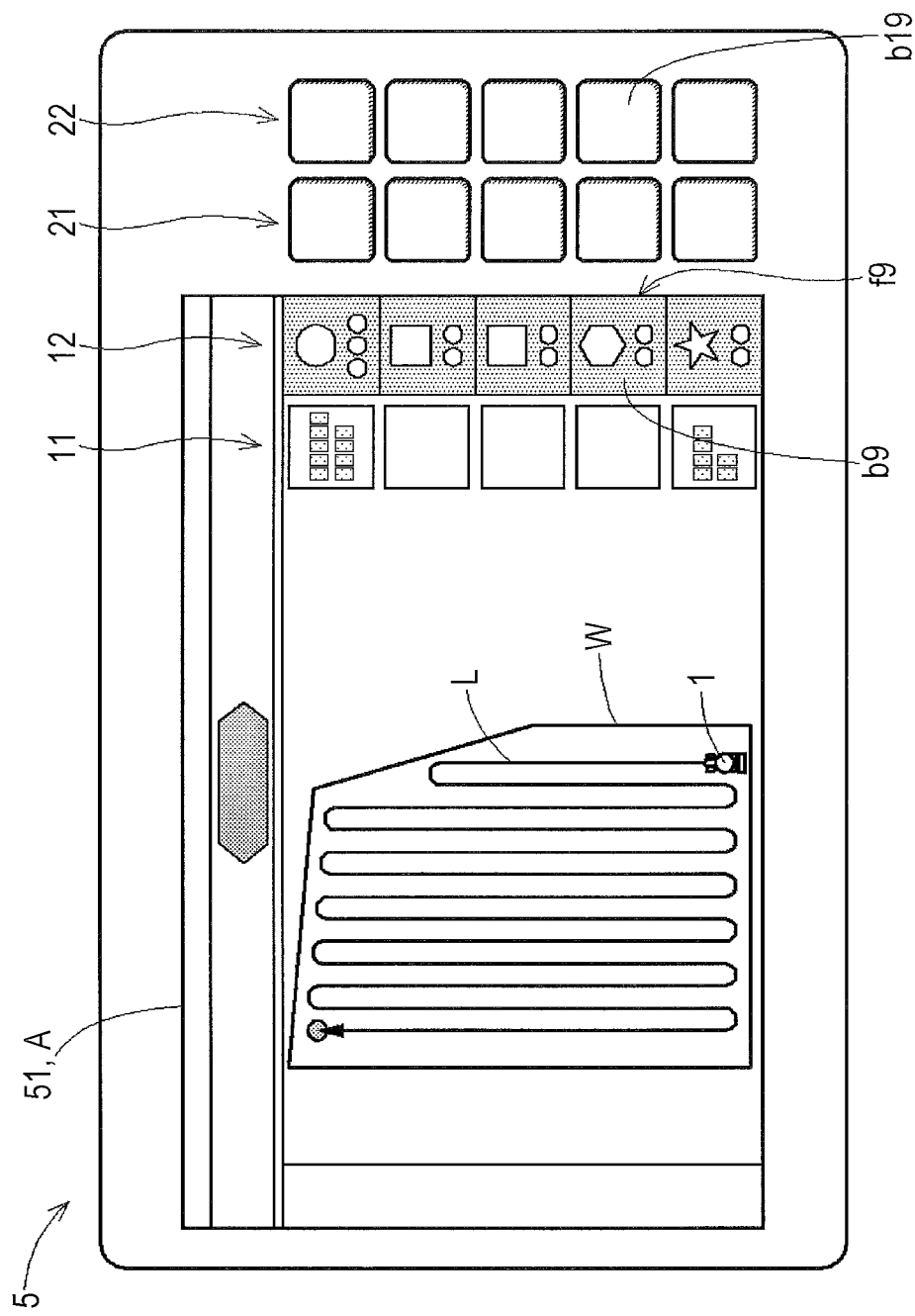
FIG. 7 is a view showing what is displayed on the display at a starting time of work travel.

When movement of the tractor 1 to the starting position S is completed, a whole of the target travel route L in the work field W is displayed on the display 51, as shown in FIG. 7. Additionally, the tractor 1 is placed in the starting position S in FIG. 7.

Also, in a state shown in FIG. 6, characters "next" are displayed faintly at the ninth function display part f9 of the ninth button b9 in the present embodiment. On the other hand, in a state shown in FIG. 7, characters "next" are displayed thickly at the ninth function display part f9 of the ninth button b9.

In a state shown in FIG. 6, both of operations of the ninth button b9 and the nineteenth button b19 are invalid. Also, in a state shown in FIG. 7, both of operations of the ninth button b9 and the nineteenth button b19 are valid.

Thus, the button display part 101 can switch a display state of the second touch button 12 between the first display state and the second display state. Then, in a case where a display state of the second touch button 12 is the first display state, both of operations of the second touch button 12 and the second physical button 22 are valid.

Also, in a case where a display state of the second touch button 12 is the second display state, both of operations of the second touch button 12 and the second physical button 22 are invalid.

More specifically, in a case where a display state of a certain second touch button 12 out of the five second touch buttons 12 is the first display state, characters or symbols are displayed thickly at the certain second touch button 12. At that time, both of operations of the certain second touch button 12 and one of the second physical buttons 22 which corresponds to the certain second touch button 12 are valid.

Also, in a case where a display state of a certain second touch button 12 out of the five second touch buttons 12 is the second display state, characters or symbols are displayed faintly at the certain second touch button 12. At that time, operations of the certain second touch button 12 and one of the second physical buttons 22 which corresponds to the certain second touch button 12 are invalid.

Function of Each Button During Work Travel

Next, referring to FIGS. 3, 4, and 8 to 10, functions of the first to twentieth buttons b1 to b20 which are fulfilled while the tractor 1 is travelling and working, will be described.

After movement of the tractor 1 to the starting position S is completed, upon an operator's press of a driving start button (not shown) included in the tractor 1, work travel by automatic driving is started. FIGS. 3, 4, and 8 to 10 show the terminal device 5 during work travel of the tractor 1.

Figure 8:
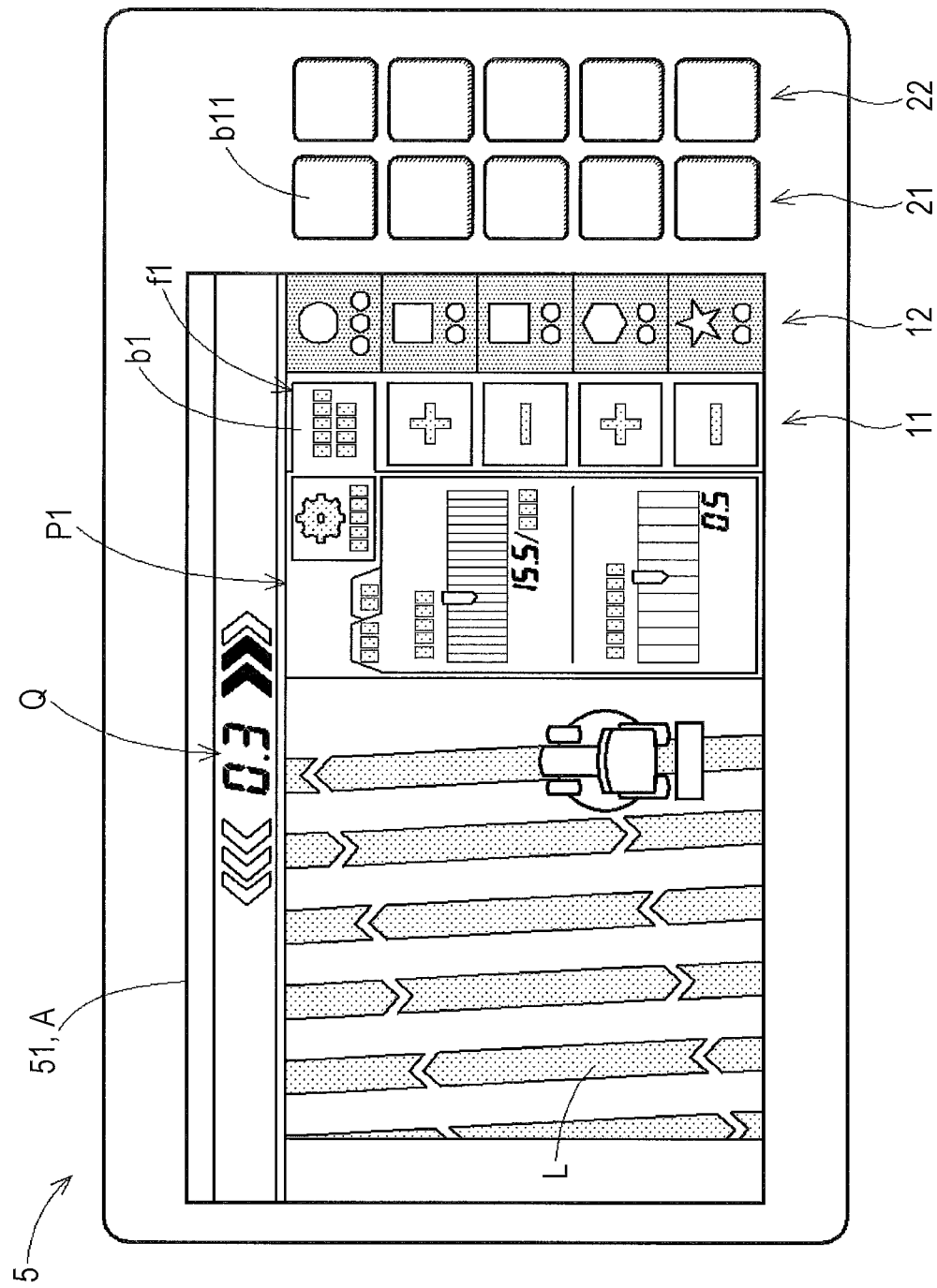
FIG. 8 is a view showing what is displayed on the display during work travel.

While the tractor 1 is travelling and working, characters "change of setting" are displayed at the first function display part f1 of the first button b1 in the present embodiment, though FIGS. 3, 4, and 8 provide schematic illustration. In a state shown in FIG. 3, when an operator operates the first button b1 or the eleventh button b1, a setting change window P1 is displayed as shown in FIG. 8.

In the setting change window P1, a current vehicle speed of the tractor 1 and a depth of plowing are displayed. Additionally, each of the vehicle speed and the depth of plowing is one kind of the above-described work information.

Also, while the tractor 1 is traveling and working, characters "display of state" are displayed at the second function display part f2 of the second button b2 in the present embodiment, though FIGS. 3 and 4 provide schematic illustration. Also, characters "recording of work" are displayed at the third function display part f3 of the third button b3. Also, characters "display of track" are displayed at the fourth function display part f4 of the fourth button b4. Also, characters "erasing of track" are displayed at the fifth function display part f5 of the fifth button f5.

When the setting change window P1 is displayed, what is displayed at the second function display part f2 of the second button b2 shown in FIGS. 3 and 4 is changed from characters "display of state" to a symbol "+" as shown in FIG. 8. Also, at the same time, what is displayed at the third function display part f3 is changed from "recording of work" to "−", what is displayed at the fourth function display part f4 is changed from "display of track" to "+", and what is displayed at the fifth function display part f5 is changed from "erasing of track" to "−".

Also, at that time, respective functions assigned to the five first touch buttons 11 and the five first physical buttons 21 are changed.

As shown in FIG. 3, when the setting change window P1 is not displayed, a function of the first button b1 and the eleventh button b11 is to open the setting change window P1. Also, a function of the second button b2 and the twelfth button b12 is to display a state of a vehicle, such as an oil temperature of the transmission 6. Also, a function of the third button b3 and the thirteenth button b13 is to open a work situation window P2 shown in FIG. 9. Also, a function of the fourth button b4 and the fourteenth button b14 is to display a travel track of the tractor 1. Also, a function of the fifth button b5 and the fifteenth button b15 is to erase a recorded travel track of the tractor 1.

On the other hand, as shown in FIG. 8, when the setting change window P is displayed, a function of the first button b1 and the eleventh button b11 is to close the setting change window P1. Also, a function of the second button b2 and the twelfth button b12 is to increase a set vehicle speed of the tractor 1. Also, a function of the third button b3 and the thirteenth button b13 is to reduce a set vehicle speed of the tractor 1. Also, a function of the fourth button b4 and the fourteenth button b14 is to increase a depth of plowing of the tractor 1. Also, a function of the fifth button b5 and the fifteenth button b15 is to reduce a depth of plowing of the tractor 1.

That is, when the setting change window P1 is displayed, functions assigned to the five first touch buttons 11 and the five first physical buttons 21 are changed, respectively.

Then, such a change in function is carried out by the function change part 103 in accordance with work information displayed on the display 51.

Thus, the function change part 103 is configured to change respective functions assigned to the five first touch buttons 11 and the five first physical buttons 21 in accordance with work information displayed on the display 51.

Also, while the tractor 1 is travelling and working, characters "current location" are displayed at the sixth function display part f6 of the sixth button b6 out of the five second touch buttons 12 in the present embodiment, though FIGS. 3 and 4 provide schematic illustration. Also, characters "enlargement" are displayed at the seventh function display part f7 of the seventh button b7. Also, characters "reduction" are displayed at the eighth function display part f8 of the eighth button b8. Also, characters "next" are displayed at the ninth function display part f9 of the ninth button b9. Also, characters "return" are displayed at the tenth function display part f10 of the tenth button b10.

Then, as shown in FIG. 8, even when the setting change window P1 is displayed, what is displayed at the sixth function display part f6, the seventh function display part f7, the eighth function display part f8, the ninth function display part f9, and the tenth function display part f10 of the five second touch buttons 12 is not changed.

Also, respective functions assigned to the five second touch buttons 12 and the five second physical buttons 22 are unchanged irrespective of whether or not the setting change window P1 is displayed.

More specifically, as shown in FIGS. 3, 4, and 8, in both of a case where the setting change window P1 is displayed and a case where the setting change window P1 is not displayed, a function of the sixth button b6 and the sixteenth button b16 is to display a current location of the tractor 1 in the work field W. Also, a function of the seventh button b7 and the seventeenth button b17 is to enlarge map display of the work field W on the display 51. Also, a function of the eighth button b8 and the eighteenth button b18 is to reduce map display of the work field W on the display 51. Also, a function of the ninth button b9 and the nineteenth button b19 is to allow message display, display for various settings, or the like on the display 51 to proceed to a next screen. Also, a function of the tenth button b10 and the twentieth button b20 is to return to a preceding screen.

Thus, respective functions assigned to the five second touch buttons 12 and the five second physical button 22 are unchanged irrespective of work information displayed on the display 51.

Figure 9:
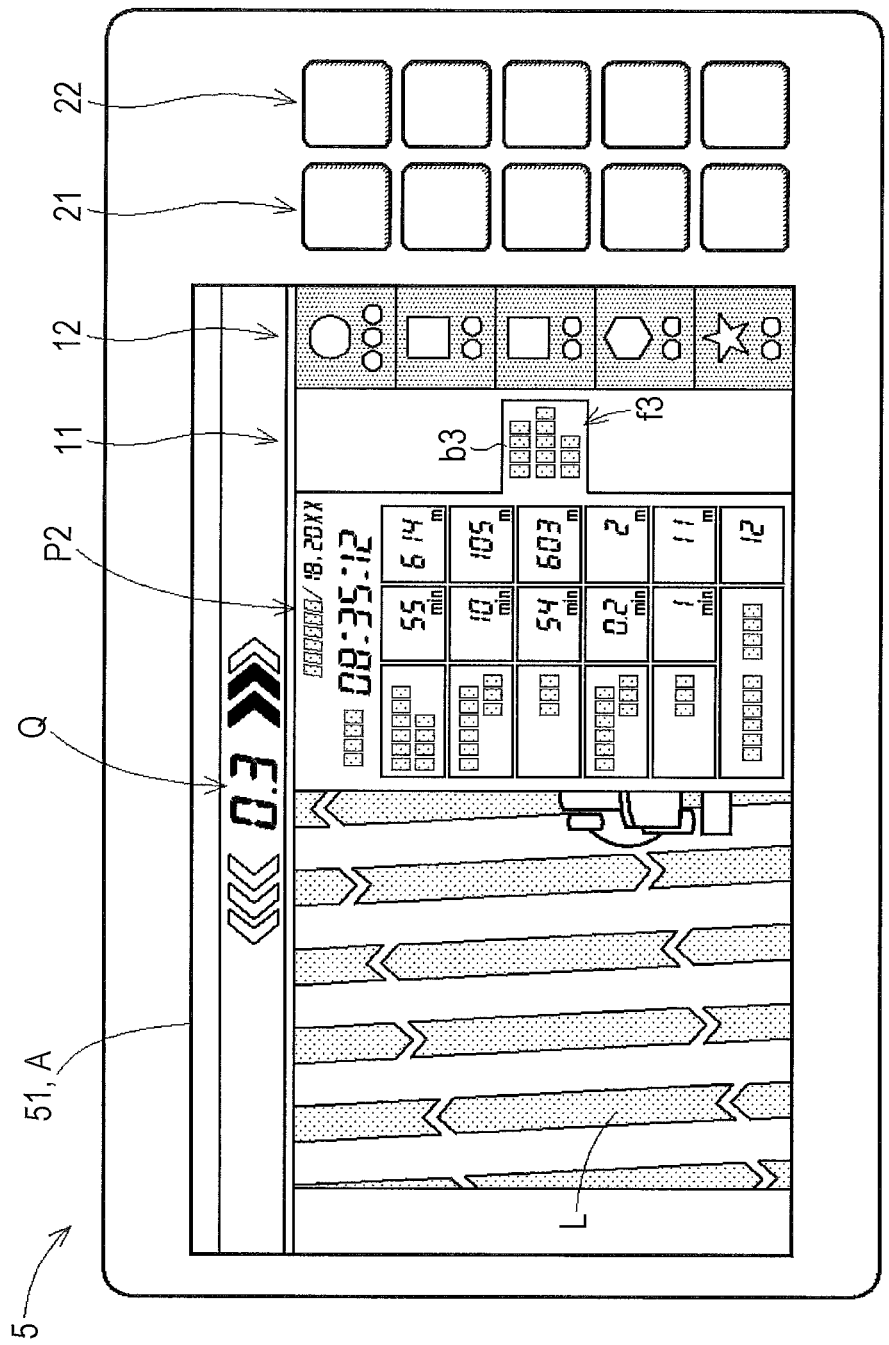
FIG. 9 is a view showing what is displayed on the display during work travel.

Also, in FIG. 8, all of the first touch buttons 11 are displayed on the display 51. On the other hand, as shown in FIG. 9, when the work situation window P2 is displayed, the first button b1, the second button b2, the fourth button b4, and the fifth button b5 out of the five first touch buttons 11 are not displayed on the display 51.

Then, in a state shown in FIG. 8, all of operations of the five first touch buttons 11 are valid. On the other hand, in a state shown in FIG. 9, all of operations of the first button b1, the second button b2, the fourth button b4, and the fifth button b5 out of the five first touch buttons 11 are invalid. Also, in a state shown in FIG. 9, all of operations of the eleventh button b11, the twelfth button b12, the fourteenth button b14, and the fifteenth button b15 are invalid.

Thus, the button display part 101 can switch a display state of the first touch button 11 between the first display state and the second display state. Then, in a case where a display state of the first touch button 11 is the first display state, both of operations of the first touch button 11 and the first physical button 21 are valid.

Also, in a case where a display state of the first touch button 11 is the second display state, both of operations of the first touch button 11 and the first physical button 21 are invalid.

More specifically, in a case where a display state of a certain first touch button 11 out of the five first touch buttons 11 is the first display state, the certain first touch button 11 is displayed on the display 51. At that time, both operations of the certain first touch button 11 and one of the first physical buttons 21 which corresponds to the certain first touch button 11 are valid.

Also, in a case where a display state of a certain first touch button 11 out of the five first touch buttons 11 is the second display state, the certain first touch button 11 is not displayed on the display 51. At that time, both of operations of the certain first touch button 11 and one of the first physical buttons 21 which corresponds to the certain first touch button 11 are invalid.

Display of Index Value During Work Travel

As shown in FIG. 3 and FIGS. 8 to 10, an index-value display area Q is located in an upper portion of the display 51. In the index-value display area Q, an index value which indicates a degree of deviation of an actual travel track from the target travel route L.

In the present embodiment, the foregoing index value is a directional deviation which is a deviation of travel direction of an own vehicle from a direction of the target travel route L. It is noted that the index value is not limited to a directional deviation, and may be a positional deviation of an own vehicle from the target travel route L.

In the present embodiment, a directional deviation serving as an index value is calculated by the index-value calculation part 104 based on a signal provided from the own-vehicle direction detection device 61. Then, the calculated directional deviation is displayed in the index-value display area Q by the index-value display part 105. It is noted that what is displayed in the index-value display area Q by the index-value display part 105 is not limited to a number. The index-value display part 105 can display also an indicator or the like which indicates a direction of deviation or an amount of directional deviation, in the index-value display area Q.

Also, the index-value display part 105 is configured to display a directional deviation in any of colors of green, yellow (which is equivalent to a "first color" according to the embodiment of the present invention), and red (which is equivalent to a "second color" according to the embodiment of the present invention), on the display 51, in accordance with an amount of a directional deviation. More specifically, a color of a directional deviation which is displayed is green when a directional deviation is relatively small, is yellow when a directional deviation is moderate, and is red when a directional deviation is relatively large.

Figure 10:
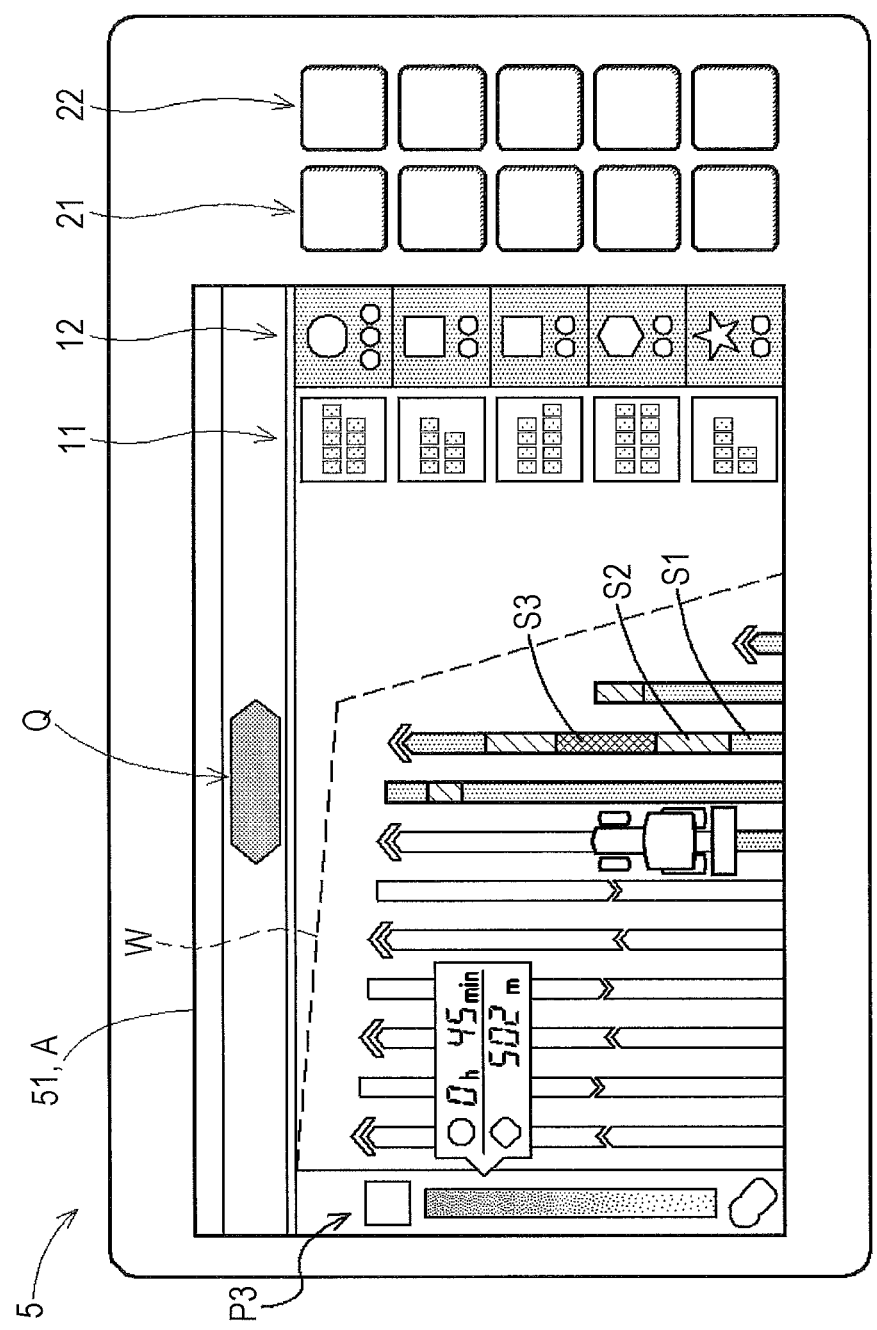
FIG. 10 is a view showing what is displayed on the display during work travel.

As shown in FIGS. 3 and 10, in a case where a directional deviation is relatively small, no number is displayed in the index-value display area Q. At that time, a green indicator in a shape of a hexagon which is horizontally lengthened is displayed in the index-value display area Q by the index-value display part 105. This indicator informs an operator that a current directional deviation is relatively small. That is, the indicator serves to display a directional deviation.

Also, as shown in FIGS. 8 and 9, in a case where a directional deviation is moderate or relatively large, a number indicating a directional deviation is displayed in the index-value display area Q by the index-value display part 105. Also, at that time, an indicator indicating a direction and an amount of deviation is displayed in a position adjacent to the number indicating a directional deviation by the index-value display part 105. In an example shown in FIGS. 8 and 9, the indicator indicates that a travel direction of an own vehicle deviates rightward from a direction of the target travel route L.

Then, such a number and indicator as described above are displayed in yellow when a directional deviation is moderate, and are displayed in red when a directional deviation is relatively large.

The color-coding operation part 106 shown in FIG. 5 is configured to color-code a portion which the tractor 1 has traveled in the target travel route L displayed on the display 51, with the use of colors of green, yellow, and red, as shown in FIG. 10.

More specifically, the color-coding operation part 106 color-codes in green, a section where a directional deviation is displayed in green, color-codes in yellow, a section where a directional deviation is displayed in yellow, and color-codes in red, a section where a directional deviation is displayed in red, in the index-value display area Q.

In the present embodiment, assume that a directional deviation is displayed in green in the index-value display area Q when the tractor 1 travels a first section s1 shown in FIG. 10. Also, assume that a directional deviation is displayed in yellow in the index-value display area Q when the tractor 1 travels a second section s2 shown in FIG. 10. Also, assume that a directional deviation is displayed in red in the index-value display area Q when the tractor 1 travels a third section s3 shown in FIG. 10.

In this case, as shown in FIG. 10, the first section s1 in the target travel route L displayed on the display 51 is color-coded in green. Also, the second section s2 is color-coded in yellow. Also, the third section s3 is color-coded in red.

Thus, the color-coding operation part 106 is configured to color-code a portion where the tractor 1 has traveled in the target travel route L displayed on the display 51, in accordance with an index value.

As shown in FIG. 10, the display 51 can display a remaining-time display window P3. In the remaining-time display window P3, an estimated value of remaining time before the tractor 1 finishes travelling a whole of the target travel route L is displayed.

The estimated value of remaining time is displayed on the display 51 by the remaining-time display part 110 shown in FIG. 5.

Figure 11:
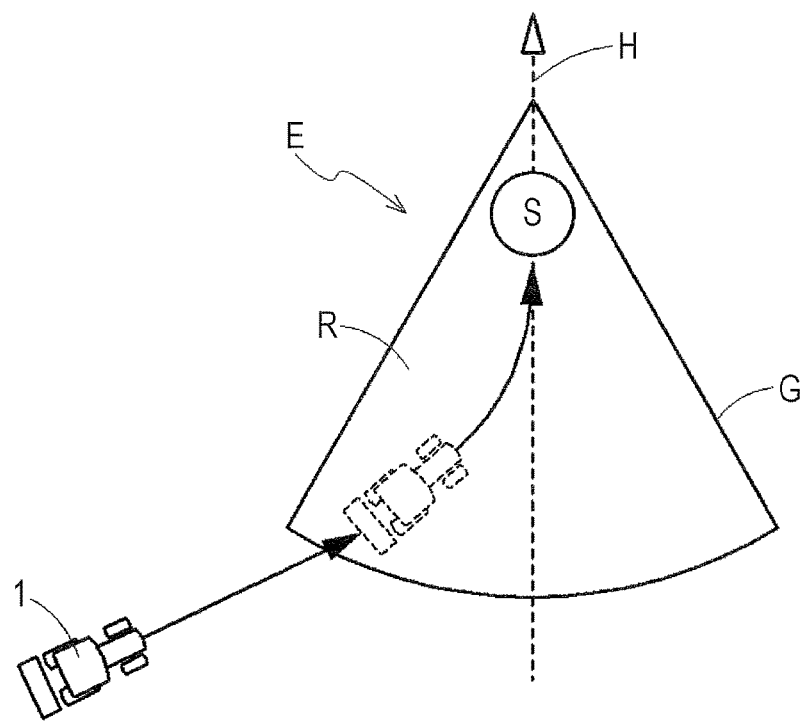
FIG. 11 is a view showing a guide start area in the other embodiment.
Figure 12:
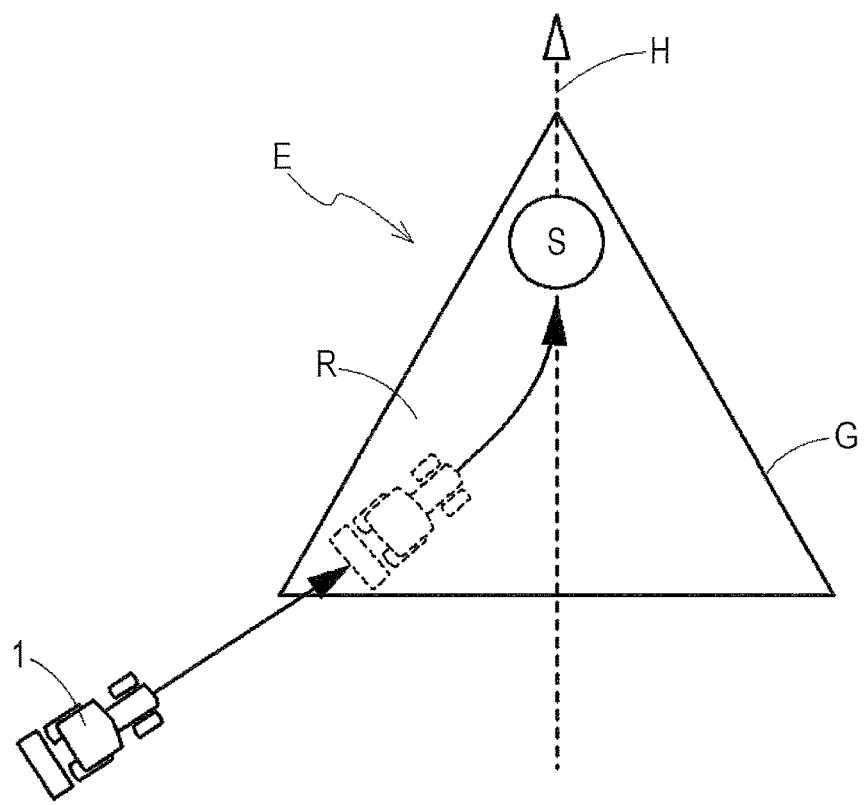
FIG. 12 is a view showing a guide start area in the other embodiment.
Figure 13:
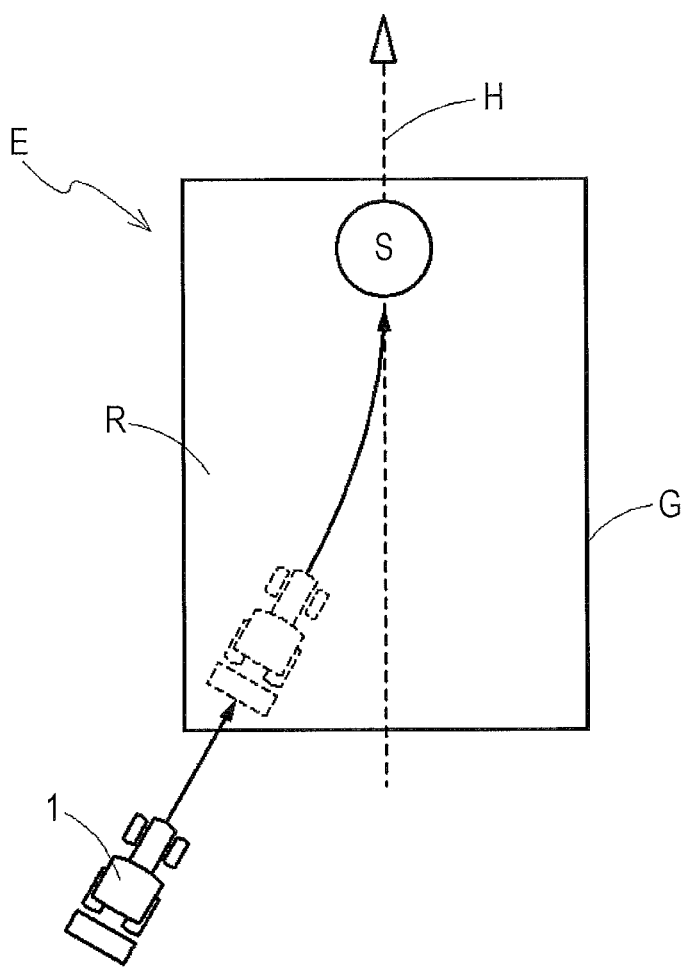
FIG. 13 is a view showing a guide start area in the other embodiment.

Other Embodiments (1) In the above-described embodiment, the guide start area R is in a trapezoidal shape as shown in FIG. 6. For this reason, also the figure G displayed on the display 51 is in a trapezoidal shape. However, in place of this configuration, there may be provided a configuration in which the guide start area R is in a shape of sector and also the figure G displayed on the display 51 is in a shape of sector as shown in FIG. 11. Also, there may be provided a configuration in which the guide start area R is a triangular shape and also the figure G displayed on the display 51 is in a triangular shape, as shown in FIG. 12. Also, there may be provided a configuration in which the guide start area R is a rectangular shape and also the figure G displayed on the display 51 is in a rectangular shape, as shown in FIG. 13.

(2) In the above-described embodiment, the first touch buttons 11, the second touch buttons 12, the first physical buttons 21, and the second physical buttons 22 each include five buttons which are in vertical arrangement. However, in place of this configuration, there may be provided a configuration in which a plurality of the first touch buttons 11, a plurality of the second touch buttons 12, a plurality of the first physical buttons, 21, and a plurality of the second physical buttons are each provided in horizontal arrangement. Also, the number of first touch buttons 11, the second touch buttons 12, the first physical buttons 21, or the second physical buttons 22 may be six or more, and may be four or less. Also, the first touch buttons 11, the second touch buttons 12, the first physical buttons 21, and the second physical buttons 22 may each include one button.

(3) The second touch buttons 12 may be omitted.

(4) The second physical buttons 22 may be omitted.

(5) There may be provided a configuration in which in a case where a display state of a certain second touch button 12 out of the plurality of second touch buttons 12 is the first display state, the certain second touch button 12 is displayed on the display 51, and in a case where the display state is the second display state, the certain second touch button 12 is not displayed on the display 51.

(6) There may be provided a configuration in which in a case where a display state of a certain first touch button 11 out of the plurality of first touch buttons 11 is the first display state, characters or symbols are displayed thickly at the certain first touch button 11, and in a case where the display state is the second display state, characters or symbols are displayed faintly at the certain first touch button 11.

(7) There may be provided a configuration in which each of display states of the plurality of first touch buttons 11 cannot be switched between the first display state and the second display state.

(8) There may be provided a configuration in which each of display states of the plurality of second touch buttons 12 cannot be switched between the first display state and the second display state.

(9) The plurality of first touch buttons 11 and the plurality of second touch buttons 12 are not necessarily required to be adjacent to each other. For example, there may be provided a configuration in which the plurality of first touch buttons 11 are placed in a left end portion of the display 51 and the plurality of the second touch buttons 12 are placed in a right end portion of the display 51.

(10) The touch-button display area D1 and the physical-button placement area D2 are not necessarily required to be adjacent to each other. For example, there may be provided a configuration in which the touch-button display area D1 is placed in a left end portion of the display 51 and the physical-button placement area D2 is placed in a position on the right of the display 51.

(11) The travel device 3 may be of either a crawler type or a semi-crawler type.

(12) A color of an inside of the figure G in a case where a display state of the guide index E is the first display state may be displayed in other colors than orange.

(13) A color of an inside of the figure G in a case where a display state of the guide index E is the second display state may be displayed in other colors than green.

(14) A color of the guide index E in the first display state and a color of the guide index E in the second display state may be identical to each other. In such a case, there may be provided a configuration in which the guide index E in the first display state is displayed in a blinking state, and the guide index E in the second display state is displayed in a simply-lighted-up state, for example.

(15) There may be provided a configuration in which a display state of the guide index E cannot be switched between the first display state and the second display state.

(16) The guide index E may include only the direction indication symbol H out of the figure G and the direction indication symbol H. In other words, there may be provided a configuration in which only the direction indication symbol H is displayed on the display 51 and the figure G is not displayed.

(17) The guide index E may include only the figure G out of the figure G and the direction indication symbol H. In other words, there may be provided a configuration in which only the figure G is displayed on the display 51 and the direction indication symbol H is not displayed.

(18) The own-vehicle direction detection device 61 may be omitted.

(19) The own-vehicle position detection device 62 may be omitted.

(20) There may be provided a configuration in which no index value is displayed on the display 51.

(21) A color of an index value displayed on the display 51 may be consistently unchanged irrespective of a magnitude of an index value.

(22) The color-coding operation part 106 may be configured so as to color-code the target travel route L independently of a color of an index value displayed on the display 51.

(23) A color of an index value displayed on the display 51 may be any of the other colors than green, yellow, and red.

(24) Color-coding performed by the color-coding operation part 106 is not limited to a color-coding pattern in the above-described embodiment. For example, there may be provided a configuration in which the target travel route L is color-coded in other combinations of colors than a combination of green, yellow, and red. Also, there may be provided a configuration in which the target travel route L is color-coded in two colors, or a configuration in which the target travel route L is color-coded in four or more colors.

(25) The remaining-time display part 110 may be omitted.

(26) The tractor 1 may be configured such that work travel by automatic driving cannot be performed and only manual work travel can be performed.

(27) While the above-described embodiment describes an example in which the display 51 and the control device 100 are provided so as to be fixed to a work vehicle, a configuration is not limited to that in the foregoing example. There may be provided a configuration in which the display 51 and the control device 100 are provided in a portable terminal apparatus that an operator can carry. Alternatively, there may be provided a configuration in which the display 51 and the control device 100 are provided in a ground-based controller for management which is installed at a location remote from a work vehicle. As a result of this, the same functions as described above can be fulfilled in a portable terminal apparatus or a ground-based controller for management.

Industrial Applicability

The embodiment of the present invention is applicable to a head-feeding combine-harvester, a normal-type combine-harvester, a corn harvester, a rice transplanting machine, and the like, in addition to a tractor.

The features of the present invention reside in inclusion of: a display which is capable of displaying a target travel route in a work field; an index-value calculation device which calculates an index value indicating a degree of a deviation of an actual travel track from the target travel route; and a color-coding operation device which color-codes a portion where the work vehicle has traveled in the target travel route displayed on the display, in accordance with the index value.

According to the embodiment of the present invention, a portion where the work vehicle has traveled in the target travel route displayed on the display is color-coded in accordance with a degree of a deviation of an actual travel track from the target travel route. This allows an operator to easily grasp a spot where the target travel route and an actual travel track deviate from each other.

Further, according to the embodiment of the present invention, an operator is allowed to distinguish a portion where the work vehicle has traveled from a portion where the work vehicle has not traveled in the target travel route. Accordingly, an operator can intuitively grasp what percentage of travel along a whole of the target travel route is finished.

Further, it is preferable in the embodiment of the present invention that an own-vehicle direction detection device which detects a direction of travel of an own vehicle is further included, and the index value is a directional deviation which is a deviation of the direction of the travel of the own vehicle from a direction of the target travel route.

A direction of travel of an own vehicle and a direction of the target travel route can be measured with a relatively small error. Accordingly, it is possible to reduce an error in an index value to a relatively small amount by adopting a directional deviation as an index value.

Therefore, with the above-described configuration, an error in an index value is relatively small, so that accuracy in color-coding of the target travel route which is performed by the color-coding operation device is improved.

Further, it is preferable in the embodiment of the present invention that an own-vehicle position detection device which detects a position of an own vehicle is further included, and the index value is a positional deviation which is a deviation of the position of the own vehicle from the target travel route.

Even in a case where a directional deviation which is a deviation of a direction of travel from a direction of the target travel route is relatively small, a situation in which continuous travel in a certain direction of travel results in an increased positional deviation of a position of an own vehicle from the target travel route, is expected.

In this regard, with the above-described configuration, the target travel route is color-coded in accordance with a positional deviation of an own vehicle from the target travel route. Accordingly, such an increased positional deviation as described above can be reflected in color-coding of the target travel route.

Further, it is preferable in the embodiment of the present invention that an index-value display device which displays the index value on the display is further included With this configuration, an index value indicating a real-time deviation of an actual travel track from the target travel route is displayed on the display, so that an operator can properly grasp a deviation of an actual travel track from the target travel route.

Further, it is preferable in the embodiment of the present invention that the index-value display device is configured to display the index value in any of a plurality of colors including a first color and a second color, on the display, in accordance with a magnitude of the index value, and the color-coding operation device is configured to color-code in the first color, a section where the index value is displayed in the first color, and color-code in the second color, a section where the index value is displayed in the second color, in a portion where the work vehicle has traveled in the target travel route displayed on the display.

With this configuration, an index value indicating a real-time deviation of an actual travel track from the target travel route is represented in the same color as a deviation of an actual travel track from the target travel route in a portion where the work vehicle has traveled. This makes it easy for an operator to intuitively grasp a deviation of an actual travel track from the target travel route.

Further, it is preferable in the embodiment of the present invention that a remaining-time display device which displays an estimated value of a remaining time before the work vehicle finishes traveling along a whole of the target travel route, on the display, is further included.

With this configuration, an operator can properly grasp a time required for work.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
   a memory to store a target travel route in a work field;
   a sensor to detect an actual travel track of the work vehicle;
   a processor unit programmed to calculate an index value indicating a degree of a deviation of the actual travel track from the target travel route; and
   a display to display an index-value display area and a work field including a traveled track on which the work vehicle has traveled such that a display pattern to display the traveled track is changed according to the index value, the traveled track being on the target travel route,
   wherein the processor unit is programmed to display, on the display, the traveled track having one or more sections that are color-coded according to the index value,
   wherein the processor unit is programmed to display, on the display, a first section of the one or more sections in a first color based on a first degree of deviation of the actual travel track from the target travel route, and a second section of the one or more sections in a second color based on a first degree of deviation of the actual travel track from the target travel route,
   wherein the processor unit is programmed to display, on the display, the index value in the index-value display area, the index value including directional indicators and a numerical value indicating the degree of deviation of the actual travel track from the target travel route, and
   wherein the processor unit is programmed to display, on the display, when the work vehicle is travelling in the first section, the index value in the index-value display section and the first section are both displayed in the first color, and, when the work vehicle is travelling in the second section, the index value in the index-value display section and the second section are both displayed in the second color.

2. The work vehicle according to claim 1,
   wherein the sensor includes a vehicle direction calculator to calculate a direction of travel of the work vehicle, and
   wherein the index value indicates a directional deviation which is a deviation of the direction of the travel of the work vehicle from a direction of the target travel route.

3. The work vehicle according to claim 1,
   wherein the sensor includes a vehicle position calculator to calculate a position of the work vehicle, and
   wherein the index value indicates a positional deviation which is a deviation of the position of the work vehicle from the target travel route.

4. The work vehicle according to claim 1, wherein the display is to display a remaining time until the work vehicle finishes traveling along a whole of the target travel route.

5. A display method for a work vehicle, comprising:
   detecting an actual travel track of the work vehicle;
   calculating an index value indicating a degree of a deviation of the actual travel track from a target travel route in a work field, the target travel route being stored in a memory; and
   displaying an index-value display area and a work field including a traveled track on which the work vehicle has traveled such that a display pattern to display the traveled track is changed according to the index value, the traveled track being on the target travel route,
   wherein the traveled track is displayed having one or more sections that are color-coded according to the index value,
   wherein the traveled track is displayed having a first section of the one or more sections in a first color based on a first degree of deviation of the actual travel track from the target travel route, and a second section of the one or more sections in a second color based on a first degree of deviation of the actual travel track from the target travel route,
   wherein the index value is displayed in the index-value display area, the index value including directional indicators and a numerical value indicating the degree of deviation of the actual travel track from the target travel route, and
   wherein, when the work vehicle is travelling in the first section, the index value in the index-value display section and the first section are both displayed in the first color, and, when the work vehicle is travelling in the second section, the index value in the index-value display section and the second section are both displayed in the second color.

6. A work vehicle comprising:
   storage means for storing a target travel route in a work field;
   sensing means for detecting an actual travel track of the work vehicle;
   calculation means for calculating an index value indicating a degree of a deviation of the actual travel track from the target travel route; and
   display means for displaying an index-value display area and a work field including a traveled track on which the work vehicle has traveled such that a display pattern to display the traveled track is changed according to the index value, the traveled track being on the target travel route,
   wherein the display means is configured to display the traveled track having one or more sections that are color-coded according to the index value,
   wherein the display means is configured to display a first section of the one or more sections in a first color based on a first degree of deviation of the actual travel track from the target travel route, and a second section of the one or more sections in a second color based on a first degree of deviation of the actual travel track from the target travel route,
   wherein the display means is configured to display the index value in the index-value display area, the index value including directional indicators and a numerical value indicating the degree of deviation of the actual travel track from the target travel route, and wherein the display means is configured to display, when the work vehicle is travelling in the first section, the index value in the index-value display section and the first section are both displayed in the first color, and, when the work vehicle is travelling in the second section, the index value in the index-value display section and the second section are both displayed in the second color.

7. A display system comprising:

a memory to store a target travel route of a work vehicle in a work field;

a sensor to detect an actual travel track of the work vehicle;

circuitry configured to calculate an index value indicating a degree of a deviation of the actual travel track from the target travel route; and a display to display an index-value display area and a work field including a traveled track on which the work vehicle has traveled such that a display pattern to display the traveled track is changed according to the index value, wherein the display is configured to display the traveled track having one or more sections that are color-coded according to the index value, wherein the display is configured to display a first section of the one or more sections in a first color based on a first degree of deviation of the actual travel track from the target travel route, and a second section of the one or more sections in a second color based on a first degree of deviation of the actual travel track from the target travel route, wherein the display is configured to display the index value in the index-value display area, the index value including directional indicators and a numerical value indicating the degree of deviation of the actual travel track from the target travel route, and wherein the display is configured to display, when the work vehicle is travelling in the first section, the index value in the index-value display section and the first section are both displayed in the first color, and, when the work vehicle is travelling in the second section, the index value in the index-value display section and the second section are both displayed in the second color.

* * * * *